United States Patent
Kaikuranta et al.

(10) Patent No.: US 7,336,980 B1
(45) Date of Patent: Feb. 26, 2008

(54) OUTER DECORATIVE COVER FOR ATTACHMENT TO A WIRELESS COMMUNICATION DEVICE INCLUDING A PRINTED CIRCUIT BOARD AND AN ASSOCIATED LIGHT SOURCE MOUNTED IN AN INTERIOR OF THE WIRELESS DEVICE

(75) Inventors: Terho Kaikuranta, Piispanristi (FI); Marko Stark, Copenhagen (DK); Niko Eiden, Helsinki (FI); Pekka Kostiainen, Helsinki (FI)

(73) Assignee: Nokia Corporation, Espoo (FI)

( * ) Notice: Subject to any disclaimer, the term of this patent is extended or adjusted under 35 U.S.C. 154(b) by 574 days.

(21) Appl. No.: 09/865,534

(22) Filed: May 29, 2001

(51) Int. Cl.
*H04M 1/00* (2006.01)
*H04B 1/06* (2006.01)
*H04B 1/38* (2006.01)

(52) U.S. Cl. ............... 455/575.6; 455/344; 455/90.1

(58) Field of Classification Search .......... 455/575.1, 455/575.6, 575.8, 90.1, 90.3, 550.1, 566; 455/567, 575.4, 90.2, 422.1, 344; 345/168, 345/74, 167; 359/172; 235/492; 385/123, 385/901

See application file for complete search history.

(56) References Cited

U.S. PATENT DOCUMENTS

| | | | |
|---|---|---|---|
| 3,959,729 A | | 5/1976 | Marchetti |
| 4,234,907 A | | 11/1980 | Daniel |
| 4,885,663 A | | 12/1989 | Parker |
| 4,953,205 A | * | 8/1990 | Yang ..................... 379/376.01 |
| 5,005,108 A | | 4/1991 | Pristash et al. |
| 5,087,906 A | * | 2/1992 | Eaton et al. ........... 379/376.01 |
| 5,237,607 A | * | 8/1993 | Diamantis ................... 379/419 |
| 5,237,609 A | * | 8/1993 | Kimura ....................... 713/193 |
| 5,374,921 A | | 12/1994 | Martin et al. |
| 5,523,740 A | | 6/1996 | Burgmann |
| 5,542,016 A | * | 7/1996 | Kaschke ..................... 385/123 |
| 5,895,115 A | | 4/1999 | Parker et al. |
| 6,005,700 A | * | 12/1999 | Pressler et al. ............. 398/117 |
| 6,016,038 A | | 1/2000 | Mueller et al. |
| 6,030,088 A | * | 2/2000 | Scheinberg ................... 362/85 |
| 6,046,730 A | * | 4/2000 | Bowen et al. .............. 345/168 |
| 6,079,838 A | | 6/2000 | Parker et al. |
| 6,150,774 A | | 11/2000 | Mueller et al. |
| 6,166,496 A | | 12/2000 | Lys et al. |
| 6,201,867 B1 | * | 3/2001 | Koike .................... 379/433.11 |

(Continued)

FOREIGN PATENT DOCUMENTS

EP    0 417 359 A1    3/1991

(Continued)

*Primary Examiner*—Tilahun Gesesse
(74) *Attorney, Agent, or Firm*—Banner & Witcoff, Ltd.

(57) ABSTRACT

An illuminated decorative cover for a device, and a cellular telephone having such a cover. The illuminated decorative cover includes a cover member having an inner surface and an outer surface, an optical fiber member having an input end and having a side surface adapted to transmit light therethrough, and a light source adjacent the input end of the optical fiber member to emit light from the light source to the optical fiber member for transmission from the side surface of the optical fiber member. The optical fiber member is incorporated with the cover member in a pattern, causing light from the optical fiber member to be visible through the outer surface of the cover member in the pattern when the light source is emitting light.

29 Claims, 2 Drawing Sheets

U.S. PATENT DOCUMENTS

| | | |
|---|---|---|
| 6,211,626 B1 | 4/2001 | Lys et al. |
| 6,292,901 B1 | 9/2001 | Lys et al. |
| 6,399,903 B1 * | 6/2002 | Stevenson .................. 200/5 A |
| 6,435,690 B1 * | 8/2002 | Till ............................ 362/88 |
| 6,561,702 B1 * | 5/2003 | Yik ............................ 396/420 |
| 6,643,529 B1 * | 11/2003 | Inoue et al. ............. 455/575.4 |
| 6,711,005 B2 * | 3/2004 | Martin .................. 379/110.01 |
| 2001/0018332 A1 * | 8/2001 | Lustila et al. ................. 455/90 |

FOREIGN PATENT DOCUMENTS

| | | |
|---|---|---|
| EP | 1109380 | 6/2001 |
| FR | 1 798 541 | 3/2001 |

\* cited by examiner

OUTER DECORATIVE COVER FOR ATTACHMENT TO A WIRELESS COMMUNICATION DEVICE INCLUDING A PRINTED CIRCUIT BOARD AND AN ASSOCIATED LIGHT SOURCE MOUNTED IN AN INTERIOR OF THE WIRELESS DEVICE

BACKGROUND OF THE INVENTION

Field of the Invention

The present invention pertains to illuminated decorative covers for devices such as cellular telephones. Additionally, the present invention pertains to a cellular telephone having an illuminated decorative cover.

Cellular telephones are becoming widely used. Many people desire to have a unique appearing cellular telephone, not only for its attractiveness, but also to enable them to identify their own phone from phones belonging to others.

People often have a cellular telephone with them when in locations in which the ringing of the telephone is undesirable. In such situations, the ringer of the telephone can be shut off. However, if a call is placed to the telephone while the ringer is off, the user does not know about the call unless there is some other way to indicate its arrival. While some cellular telephones retain a visual indication of unanswered calls, indicating the calling number, the user of such a phone is unlikely to learn of the call until he or she happens to activate the phone next. This may be a considerable time after the call was placed. If the call related to time sensitive information, the user may lose the benefit of the information because he or she did not notice the call soon enough. While a number of light emitting diodes can be incorporated with a cover for a device such as a cellular telephone, because of power requirements it is impractical to try to provide an illuminated decorative pattern of light emitting diodes.

SUMMARY OF THE INVENTION

The present invention is an illuminated decorative cover for a device such as a cellular telephone. In accordance with the present invention, an illuminated decorative cover includes a cover member having an inner surface and an outer surface, an optical fiber member having an input end and having a side surface adapted to transmit light therethrough, and a light source adjacent the input end of the optical fiber member to emit light from the light source to the optical fiber member for transmission from the side surface of the optical fiber member. The optical fiber member is incorporated with the cover member in a pattern, causing light from the optical fiber member to be visible through the outer surface of the cover member in the pattern when the light source is emitting light. In another aspect, the present invention is a telephone having such an illuminated decorative cover.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF THE PREFERRED EMBODIMENTS

Figure 1:
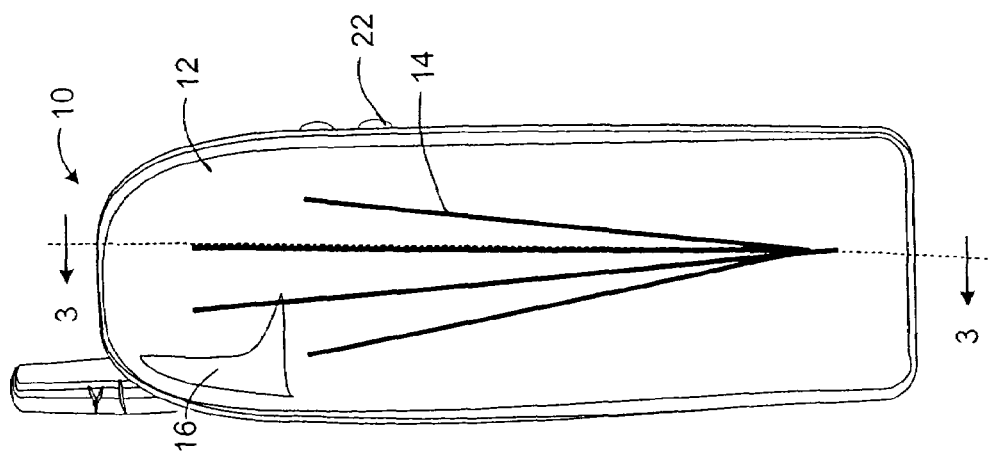
FIG. 1 is a rear plan view of a telephone and its cover, illustrating a representative example of decorative lighting that might be incorporated with the cover in accordance with a preferred embodiment of the present invention.

FIG. 1 illustrates a cellular telephone 10 having a front cover (not shown) and a rear cover 12. The rear cover 12 has incorporated therewith a decorative pattern 14 formed of a material capable of illuminating the pattern. Such material, for example, might be an optical fiber capable of transmitting light through its side surface along its length. If desired, cover 12 might also have a graphic decoration 16 which is not illuminated, but instead is simply applied to the outer surface of cover 12 in a contrasting color.

Figure 2:
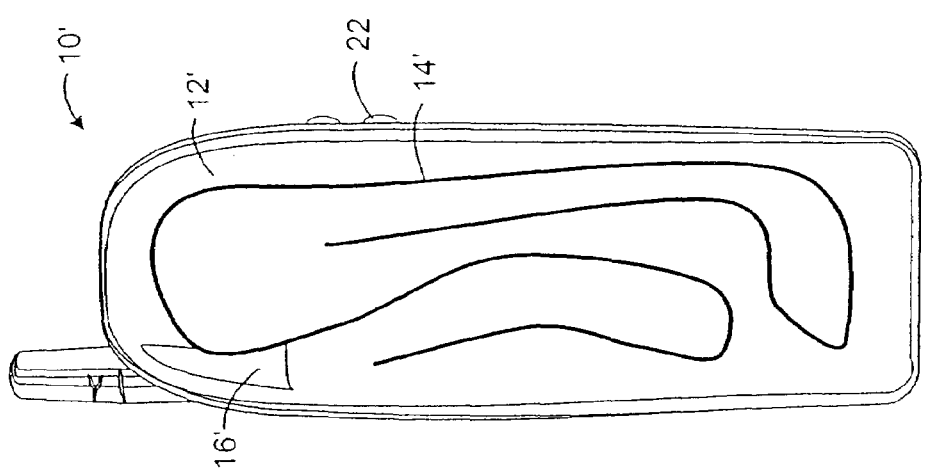
FIG. 2 is a rear plan view of another telephone and its cover, illustrating another representative example of decorative lighting that might be incorporated with the cover in accordance with a preferred embodiment of the present invention.

FIG. 2 illustrates a second cellular telephone 10' having a rear cover 12' with an illuminated decorative pattern 14' and a graphic decoration 16', illustrating that various illuminated decorative patterns can be provided in accordance with the present invention.

Figure 3:
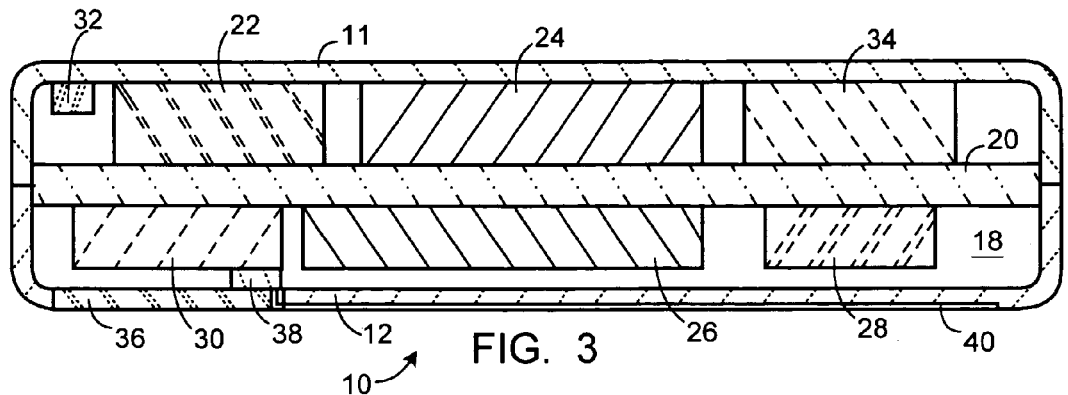
FIG. 3 is a sectional view through a cellular telephone, taken along line 3-3 of FIG. 1, illustrating incorporation of decorative lighting with the telephone cover in accordance with a first embodiment of the present invention.

FIG. 3 is a sectional view taken along line 3-3 of FIG. 1, illustrating incorporation of decorative lighting into a cellular telephone cover in accordance with a first embodiment of the present invention. Cellular telephone 10 includes a front cover 11 and a rear cover 12 which cooperate to define a telephone interior 18. Within interior 18, a mounting board, such as a printed circuit board 20, has mounted thereon components forming the telephone. Thus, for example, printed circuit board 20 might have mounted on it a keypad 22, which is accessible through front cover 11, and a display 24, which is visible through front cover 11. In addition, printed circuit board 20 might have mounted on it various electronic components 26 forming the necessary circuitry for the telephone operation, an antenna 28, and a battery 30 to provide power for the telephone operation. Further, telephone 10 includes a microphone 32, a speaker 34, and various controls such as switches (not shown), as is well known in the art. Preferably, telephone 10 is provided with contacts permitting connection to a power source such as a rectified and filtered alternating current source to permit recharging of battery 30. Electronic components 26 include circuitry applying a ringing current to speaker 34 to alert the user of an incoming telephone call, as well as a control to prevent application of the ringing current to speaker 34 when desired so that ringing of the telephone does not occur at times when it would be disruptive. If desired, telephone 10 can additionally include other optional components such as a jack for connection of an earphone. These various components are electrically connected together by wiring (not shown) to permit proper operation of the cellular telephone. Rear cover 12 includes a removable battery cover portion 36 to permit replacement of battery 30 as needed.

In addition, in accordance with the present invention, within telephone interior 28 there is provided a light source 38, for example a light emitting diode. In the embodiment of FIG. 3, light source 38 is mounted on the interior surface of battery cover 36. An optical fiber member 40 is adhered to the outer surface of rear cover 12 and has its input end mounted adjacent light source 38 so that light from source 38 is transmitted along optical fiber member 40. By way of example, light source 38 can be coupled to battery 30 by a spring biased wire, as well as appropriate controls. Optical fiber member 40 can be several optical fiber threads laid out in a pattern such as pattern 14 of FIG. 1, for example. Alternatively, optical fiber member 40 can be a single optical fiber thread forming a pattern such as pattern 14' of FIG. 2. The optical fiber threads of the optical fiber member 40 are suitable treated to permit transmission of light from their side surfaces along their length, for example by abrasion, bending, notching, or any other suitable means.

Figure 4:
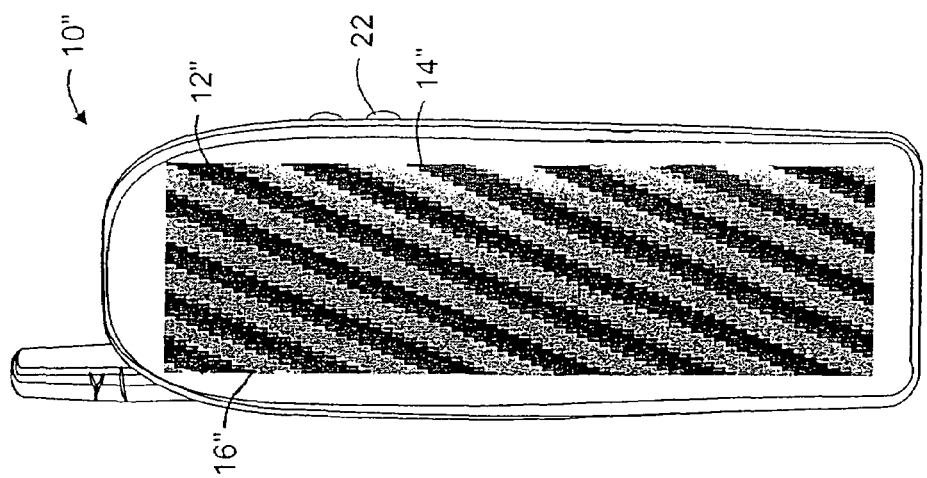
FIG. 4 is a rear plan view of yet another telephone and its cover, illustrating a further example of decorative lighting that might be incorporated with the cover in accordance with a preferred embodiment of the present invention.

As a further alternative, optical fiber member 40 can be an optical fiber panel, such as disclosed in U.S. Pat. Nos. 4,885,663, 5,005,108, or 6,079,838, the disclosures of which are incorporated herein by reference, or such as a UniGlo optical fiber panel available from Poly-Optical Products Inc. If desired, optical fiber member 40 might be made up of a number of optical fiber panel portions or a number of groups of optical fiber threads, and light source 38 can be a like number of light emitting devices, such as light emitting diodes, of various colors so that each panel portion or each group of optical fiber threads provides light of a different color. By way of illustration, FIG. 4 depicts a telephone 10" having a cover 12" with an illuminated decorative pattern 14" in the form of an optical fiber panel having stripes which can be of alternating colors or of various colors.

Figure 5:
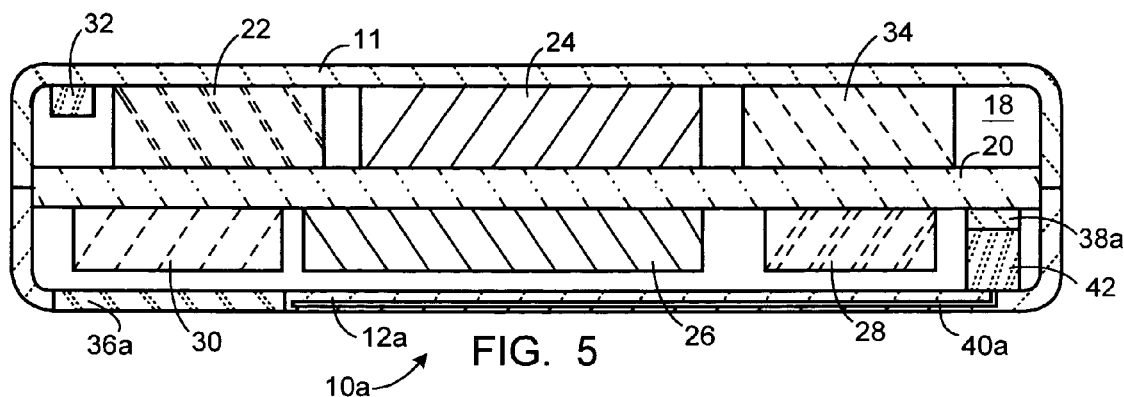
FIG. 5 is a sectional view through a cellular telephone, taken along line 3-3 of FIG. 1, illustrating incorporation of decorative lighting with the telephone cover in accordance with another embodiment of the present invention.

FIG. 5 illustrates a telephone 10a in the back panel 12a of which the optical fiber member 40a is embedded in the middle of the panel, for example during a molding process. Rear panel 12a is sufficiently clear to permit the light from optical fiber member 40a to be visible through the outer surface of the panel. Light source 38a is mounted on printed circuit board 20, and light guide 42 couples light from source 38a to the inlet end of optical fiber member 40a.

Figure 6:
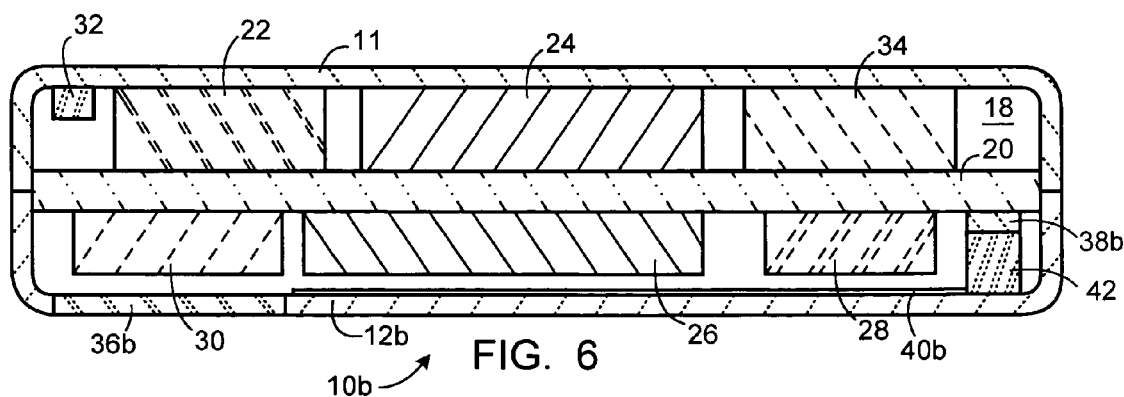
FIG. 6 is a sectional view through a cellular telephone, taken along line 3-3 of FIG. 1, illustrating incorporation of decorative lighting with the telephone cover in accordance with a further embodiment of the present invention.

FIG. 6 illustrate a telephone 10b having a light emitting member 38b mounted on the printed circuit board 20, and an optical fiber member 40b adhered to the inner surface of rear cover 12b. Light from light emitting member 38b is coupled to optical fiber member 40b by means such as a light guide 42. Again, the rear cover is of a material permitting light from the optical fiber member to be visible through the outer surface of the cover. Any combination of light emitting member location and optical fiber member position might be utilized.

Electronic components 26 preferably include circuitry that activates light source 38 when a ringing current is applied in response to receipt of an incoming telephone call. Then, even if the telephone ringing current is prevented from activating speaker 34, still optical fiber member 38 is illuminated to attract the user's attention to the incoming call. Alternatively, or additionally, the circuitry can activate light source 38 to indicate that battery 30 is low and needs recharging or can indicate any other desired condition. Further, a number of different colored light emitting members associated with different optical fiber threads or panels can be incorporated to permit playing of a visual game on the cover of the telephone or other device.

Front cover 11, rear cover 12 and battery cover 36 can be formed of a suitable molded plastic, for example. Optical fiber member 40 can be incorporated with the cover during the molding process or afterward, as desired.

A device such as a cellular telephone may be provided with a set of illuminated decorative covers in accordance with the present invention, with each cover readily attaching to and detaching from the device, permitting the user to change covers when desired. By way of example, when light source 38 is mounted on battery cover 36 as in the embodiment of FIG. 3, rear cover 12 can be replaced by another, having a different illuminated decoration, with battery cover portion 36 and light source 38 transferred to the new cover. When light source 38 is mounted on printed circuit board 20, as in the embodiments of FIGS. 5 and 6, rear cover 12 can be replaced without disturbing the light source.

If desired, front cover 11 can also be provided with illuminated decorations in accordance with the present invention. Further, devices other than cellular telephones can be provided with illuminated decorations in accordance with the invention. By way of example, land line telephones of various styles, personal digital assistants and other handheld electronic devices, and alarm clocks. Larger devices can also incorporate illuminated decorations in accordance with the present invention, for example automotive dash board panels and guidance strips for airplanes interiors.

The optical fiber member 40, 40a and 40b may be adhered to an outer or inner surface of the cover member 12, 12a and 12b or molded or embedded in the cover member. The optical member may be an optical fiber thread or an optical fiber panel.

The light source 38 may be a plurality of light emitting diodes, devices or optical fiber panel portions emitting different colors of light with input ends which are adjacent a plurality of optical threads.

Although the present invention has been described with reference to preferred embodiments, various alterations, substitutions and rearrangements can be made, and still the result will be without the scope of the invention.

What is claimed is:

1. An outer decorative cover for attachment to a wireless communication device including a printed circuit board mounted in an interior of the wireless device, the outer decorative cover comprising:
    an inner and outer surface;
    a light source mounted in the inner surface; and
    an optical fiber incorporated in a pattern as part of the outer decorative cover and including an input end for receiving light from the light source when the light source is activated and the outer decorative cover is attached to the wireless communication device and a side surface which transmits the light therethrough along a length of the fiber when the light is received by the input end so as to cause the light transmitted along the length of the fiber to be visible when viewing the outer surface,
    wherein the light source is configured to be connected to a battery external to the outer decorative cover when the outer decorative cover is attached to the wireless communication device to receive power from said battery to activate the light source to emit light.

2. An outer decorative cover as claimed in claim 1, wherein the optical member is embedded in the outer decorative cover.

3. An outer decorative cover as claimed in claim 1, wherein the optical fiber is adhered to the inner surface of the outer decorative cover.

4. An outer decorative cover as claimed in claim 1, wherein the optical fiber is adhered to the outer surface of the outer decorative cover.

5. An outer decorative cover as claimed in claim 1, wherein the light source is activated to emit light in response to receipt of an incoming call to the wireless communication device.

6. An outer decorative cover as claimed in claim 1, wherein the pattern is configured to permit playing of a visual game on the outer decorative cover of the wireless communication device.

7. An outer decorative cover for attachment to a wireless communication device including a printed circuit board mounted in an interior of the wireless device, the outer decorative cover comprising:
   an inner and outer surface;
   a light source mounted in the inner surface; and
   an optical fiber molded in a pattern as part of the outer decorative cover and including an input end for receiving light from the light source when the light source is activated and the outer decorative cover is attached to the wireless communication device and a side surface which transmits the light therethrough along a length of the fiber when the light is received by the input end so as to cause the light transmitted along the length of the fiber to be visible when viewing the outer surface,
   wherein the light source is configured to be connected to a battery external to the outer decorative cover when the outer decorative cover is attached to the wireless communication device to receive power from said battery to activate the light source to emit light.

8. An outer decorative cover as claimed in claim 7, wherein the optical fiber comprises an optical fiber thread.

9. An outer decorative cover as claimed in claim 7, wherein the optical fiber comprises an optical fiber panel.

10. An outer decorative cover as claimed in claim 7, wherein the light source comprises a plurality of light emitting devices, each light emitting device being adapted to emit light of a different color, and the optical fiber comprises a plurality of optical fiber threads, the input end of each thread being adjacent a respective one of the light emitting devices so that each thread transmits light of a different color.

11. An outer decorative cover as claimed in claim 7, wherein the light source comprises a plurality of light emitting devices, each light emitting device being adapted to emit light of a different color, and the optical fiber comprises a plurality of optical fiber panel portions, the input ends of each panel portion being adjacent a respective one of the light emitting devices so that each panel portion transmits light of a different color.

12. An outer decorative cover as claimed in claim 7, wherein the light source comprises a light emitting diode.

13. An outer decorative cover as claimed in claim 7, wherein the light source is activated to emit light in response to receipt of an incoming call to the wireless communication device.

14. An outer decorative cover as claimed in claim 7, wherein the pattern is configured to permit playing of a visual game on the outer decorative cover of the wireless communication device.

15. An outer decorative cover for attachment to a wireless communication device, the outer decorative cover comprising:
   an inner and outer surface;
   a light source mounted in the inner surface; and
   an optical fiber incorporated in a pattern as part of the outer decorative cover and including an input end for receiving light from the light source when the light source is activated,
   wherein said light source is configured such that, when activated, radiated light is viewable on the outer surface only through a length of said optical fiber when the outer decorative cover is attached to a wireless communication device.

16. An outer decorative cover as claimed in claim 15, wherein the optical fiber comprises an optical fiber thread.

17. An outer decorative cover as claimed in claim 15, wherein the optical fiber comprises an optical fiber panel.

18. An outer decorative cover as claimed in claim 15, wherein the optical fiber is adhered to the outer surface of the outer decorative cover.

19. An outer decorative cover as claimed in claim 15, wherein the light source is activated to emit light in response to receipt of an incoming call to the wireless communication device.

20. An outer decorative cover as claimed in claim 15, wherein the pattern is configured to permit playing of a visual game on the outer decorative cover of the wireless communication device.

21. An outer decorative cover for attachment to a wireless communication device, the outer decorative cover comprising:
   an inner and outer surface;
   a light source mounted in the inner surface; and
   an optical fiber incorporated in a pattern as part of the outer decorative cover and including an input end for receiving light from the light source when the light source is activated and the outer decorative cover is attached to a wireless communication,
   wherein said outer surface is at least constructed of material at locations corresponding to the optical fiber pattern to permit the light, which is received by the input end and transmitted through a side surface along a length of the optical fiber, to be visible through the outer surface of the outer decorative cover.

22. An outer decorative cover as claimed in claim 21, wherein the optical fiber comprises an optical fiber thread.

23. An outer decorative cover as claimed in claim 21, wherein the optical fiber comprises an optical fiber panel.

24. An outer decorative cover as claimed in claim 21, wherein the light source comprises a plurality of light emitting devices, each light emitting device being adapted to emit light of a different color, and the optical fiber comprises a plurality of optical fiber threads, the input end of each thread being adjacent a respective one of the light emitting devices so that each thread transmits light of a different color.

25. An outer decorative cover as claimed in claim 21, wherein the light source comprises a plurality of light emitting devices, each light emitting device being adapted to emit light of a different color, and the optical fiber comprises a plurality of optical fiber panel portions, the input ends of each panel portion being adjacent a respective one of the light emitting devices so that each panel portion transmits light of a different color.

26. An outer decorative cover as claimed in claim 21, wherein the light source comprises a light emitting diode.

27. An outer decorative cover as claimed in claim 21, wherein the light source is activated to emit light in response to receipt of an incoming call to the wireless communication device.

28. An outer decorative cover as claimed in claim 21, wherein the pattern is configured to permit playing of a visual game on the outer decorative cover of the wireless communication device.

29. A wireless communication device system comprising:
   a communication device portion including:
      a first cover;
      a printed circuit board including:
         a keypad that is accessible through the first cover;
         a display that is visible through the first cover;
         an antenna; and
         a battery; and
   a detachable second cover including:
      an inner and outer surface;
      a light source mounted to the inner surface, the light source configured to receive power to transmit light from the battery when the detachable second cover is attached to the communication device portion; and
   optical fiber incorporated in a pattern as part of the detachable second cover, the optical fiber including:
      an input end for receiving light from the light source when the light source is activated and the detachable second cover is attached to the communication device portion; and
      a side surface which transmits the light therethrough along a length of the optical fiber when the light is received by the input end so as to cause the light transmitted along the length of the optical fiber to be visible when viewing the outer surface.

* * * * *